(No Model.)

E. ROSENZI.
Pot and Crucible for Making Glass and Smelting Metals.

No. 238,718. Patented March 8, 1881.

Witnesses:
Wm. H. Mortimer
A. C. Kiskadden

Inventor:
Enrico Rosenzi
per
F. A. Lehmann,
Atty

UNITED STATES PATENT OFFICE.

ENRICO ROSENZI, OF PITTSBURG, PENNSYLVANIA, ASSIGNOR OF ONE-HALF TO TIMOTHY MALONEY AND T. J. MALONEY, OF SAME PLACE.

POT AND CRUCIBLE FOR MAKING GLASS AND SMELTING METALS.

SPECIFICATION forming part of Letters Patent No. 238,718, dated March 8, 1881.

Application filed December 10, 1880. (No model.)

*To all whom it may concern:*

Be it known that I, ENRICO ROSENZI, a citizen of the United States, residing at Pittsburg, in the county of Allegheny and State of Pennsylvania, have invented certain new and useful Improvements in Pots and Crucibles for Making Glass and Smelting Metals; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to an improvement in pots or crucibles for making glass or smelting metals; and it consists in making incisions in or near the rims or openings of the pots to prevent their breaking or cracking during the operation of smelting, as will be more fully described hereinafter.

The accompanying drawings represent my invention.

Figure 1:
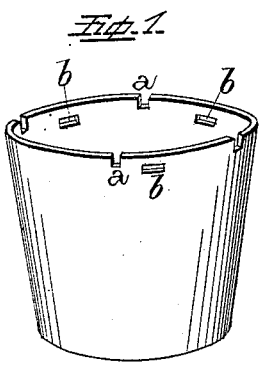
Figure 2:
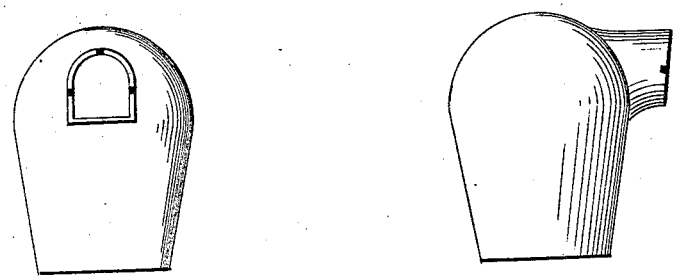
Figure 3:
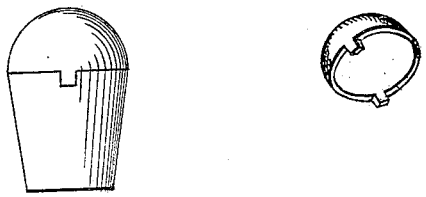

Figure 1 represents a pot for making window-glass, bottles, &c. Fig. 2 represents a pot used for making flint glass. Fig. 3 represents a crucible for smelting metals.

It is well known that in the glass-manufacturing establishments the breaking of the smelting-pots is not only of frequent occurrence, but that it also is the cause of great losses. Many attempts to prevent this have been made — such as placing bands and clamps around the pots—but the results have not proven beneficial; and my object has been to gain the desired end by other means.

In the construction of pots for making glass it is aimed to oppose the greatest strength to the greatest pressure; and to attain this the pots are made much thicker at the bottom than at the rim; but when exposed to great heat the inequality of thickness in the body of the pot necessarily produces corresponding inequalities of effect. Hence, if the expansion or contraction of one part differs much from that of another a rent or break is likely to occur. Especially does this occur when the material of the pots is somewhat brittle, from use or other cause, and the break or crack invariably begins at the rim or opening of the pot, extending downward.

To avoid the cracking of the pots for window-glass, (Fig. 1,) I make incisions $a$, of about one and a half inch in depth, at a distance of two inches from each other, in the rim, and remove the material from between them. Four of these cuts or notches in the rim of a pot, of the usual size, are sufficient to prevent cracking or breaking when exposed to a high degree of heat; or I make three horizontal incisions, $b$, equally distributed around the pot at about one inch and a half below the rim and two inches in length, as shown in Fig. 1.

The pots for flint glass (Fig. 2) being hooded or closed on top, are each provided with a short arm with an opening, instead of the opening on top, as shown in Fig. 1. The break or crack, when it occurs in this kind of pots, begins at the opening in the arm and gradually extends to the body. Three incisions, as first mentioned—i. e., from the rim of the opening, two opposite each other at the sides and one in the middle over the openings—are here sufficient to prevent cracking.

The pots or crucibles for smelting metals, although much smaller than the pots for making glass, and covered by removable lids, being made of the same material, are equally subject to breaking or cracking. In the rim of these I make three downward cuts of about one inch in width and depth, and form projections on the rims of the lids pertaining thereto, the projections fitting into the incisions, as shown in Fig. 3, so that the sides of the crucibles remain closed when the lids are on. The expansion of the crucibles is thus not interfered with, and the lids are free to yield.

I am aware that open-topped pots have had notches cut in their outer sides, and this I disclaim.

Having thus described my invention, I claim—

1. A pot or crucible having notches cut directly in its edges, substantially as shown.

2. The combination of a pot or crucible having notches made in its top edges, with a cover having corresponding projections to fit in the notches, substantially as described.

In testimony whereof I affix my signature in presence of two witnesses.

ENRICO ROSENZI.

Witnesses:
LOUIS MOESER,
TIMOTHY MALONEY.